United States Patent [19]
Siebol

[11] Patent Number: 5,305,548
[45] Date of Patent: Apr. 26, 1994

[54] ORCHARD HEAT EXCHANGER

[76] Inventor: James R. Siebol, 4300 W. Birchfield, Yak, Wash. 98901

[21] Appl. No.: 975,617

[22] Filed: Nov. 12, 1992

[51] Int. Cl.$^5$ .............................................. A01G 13/00
[52] U.S. Cl. .......................................... 47/2; 239/77; 239/14.1
[58] Field of Search ....................... 47/2; 239/77, 14.1

[56] References Cited

U.S. PATENT DOCUMENTS

| | | | |
|---|---|---|---|
| 1,903,615 | 4/1933 | Towt . | |
| 2,595,773 | 5/1952 | Davis | 47/2 |
| 2,618,508 | 11/1952 | Daugherty | 239/77 |
| 2,712,714 | 7/1955 | McGee | 47/2 |
| 2,800,746 | 7/1957 | Harmon | 47/2 |
| 2,836,932 | 6/1958 | Potter | 47/2 |
| 2,925,222 | 2/1960 | Spreng | 239/172 |
| 3,055,145 | 9/1962 | Lindsay | 47/2 |
| 3,296,739 | 1/1967 | Weigel | 239/77 |
| 4,513,529 | 4/1985 | Reich | 47/2 |
| 4,927,080 | 5/1990 | Alsing | 239/77 |
| 5,082,177 | 1/1992 | Hill et al. | 239/77 |

FOREIGN PATENT DOCUMENTS

| | | |
|---|---|---|
| 1191114 | 10/1959 | France . |
| 561059 | 10/1944 | United Kingdom . |

Primary Examiner—Henry E. Raduazo
Attorney, Agent, or Firm—George A. Cashman

[57] ABSTRACT

An orchard heat exchanger comprises an engine-driven shaft having an air propeller on each end. The assembly is enclosed in an open-ended horizontal cylindrical shroud, which has a large converging-diverging air inlet at the top, and is trailer mounted. The orchard heat exchanger has the capability of being elevated to tree-top level. In a first embodiment, the engine-propeller-shroud assembly may be rotated in a horizontal plane. In a second embodiment, there is no horizontal rotational capability, but the cylindrical shroud is fitted with directional louvers at each end.

10 Claims, 6 Drawing Sheets

ORCHARD HEAT EXCHANGER

BACKGROUND OF THE INVENTION

In orchard areas, in the Spring of the year, temperature inversions are common, and can cause damage to the fruit buds and blossoms. During a temperature inversion, the air temperature at the level of the trees is colder than the air temperature above the orchard. In some orchard areas where there is no air drainage, the still air can become particularly cold.

Various methods are used to protect the buds and blossoms against freezing. A fine water spray system can assure, up to a point, that the buds and blossoms remain at the freezing temperature of water, as the water is continually at the latent heat of fusion. A great many orchardists use wind machines, which are large motor-driven propellers mounted on towers above treetop level. Of course, ground-level heaters are also used.

Ideally, it is preferable to pull the warm air down from above the treetop level and distribute it at or below the leafy portions of the trees.

BRIEF DESCRIPTION OF THE INVENTION

The orchard heat exchanger comprises two engine-driven shrouded fans blowing air in opposite directions. The engine is within a cylindrical shroud and outside air is pulled into the shroud from the top. The orchard heat exchanger is trailer-mounted, and the shroud may be elevated to treetop level. In a first embodiment, the orchard heat exchanger may be rotated with respect to the trailer on which it is mounted. The orchardist selects a proper place for operation of the unit, tows it to the place, starts the engine, orients the shroud, and elevates the unit to a desired height. The top opening assures that warmer air will be pulled in from above and distributed at a lower level to displace the colder air at ground level. A water spray head is provided at the air intake in the first embodiment of this invention, in order to create a fog which helps protect the fruit from freezing. The spray head can also be used for spraying necessary chemicals, such as herbicide, throughout the orchard. The warmer intake air from above is also warmed first merely in its passage through the converging-diverging opening at the top of the heat exchanger. A greater source of heat is the internal combustion engine itself, by means of the engine and radiator heat, and by means of the engine exhaust. The gaseous constituents of the exhaust do not damage the fruit buds and blossoms in any way.

The second embodiment of the orchard heat exchanger does not have a rotating capability, and is designed primarily to dry fruit while it is on the tree. For example, ripe cherries must be dried on the tree if a rain occurs at or just before harvest time.

In the second embodiment, an internal combustion engine and a radiator are mounted on a baseplate. At each end of the baseplate is a stand supporting a bearing in which rotates a fan propeller shaft located over the engine. The shaft is driven by a belt from the engine. A propeller fan is mounted on each end of the shaft. The engine and bearing support baseplate is mounted above a lower baseplate which extends beyond the fan propellers. A cylindrical shroud, preferably made of fiberglass, surrounds the engine, propellers and upper and lower baseplates, and is attached to the lower baseplate. Each end of the cylindrical shroud is fitted with a set of adjustable louvers. The upper side of the shroud has a large opening, the edges of which support a converging-diverging air entry element.

DETAILED DESCRIPTION OF THE INVENTION

Figure 1:
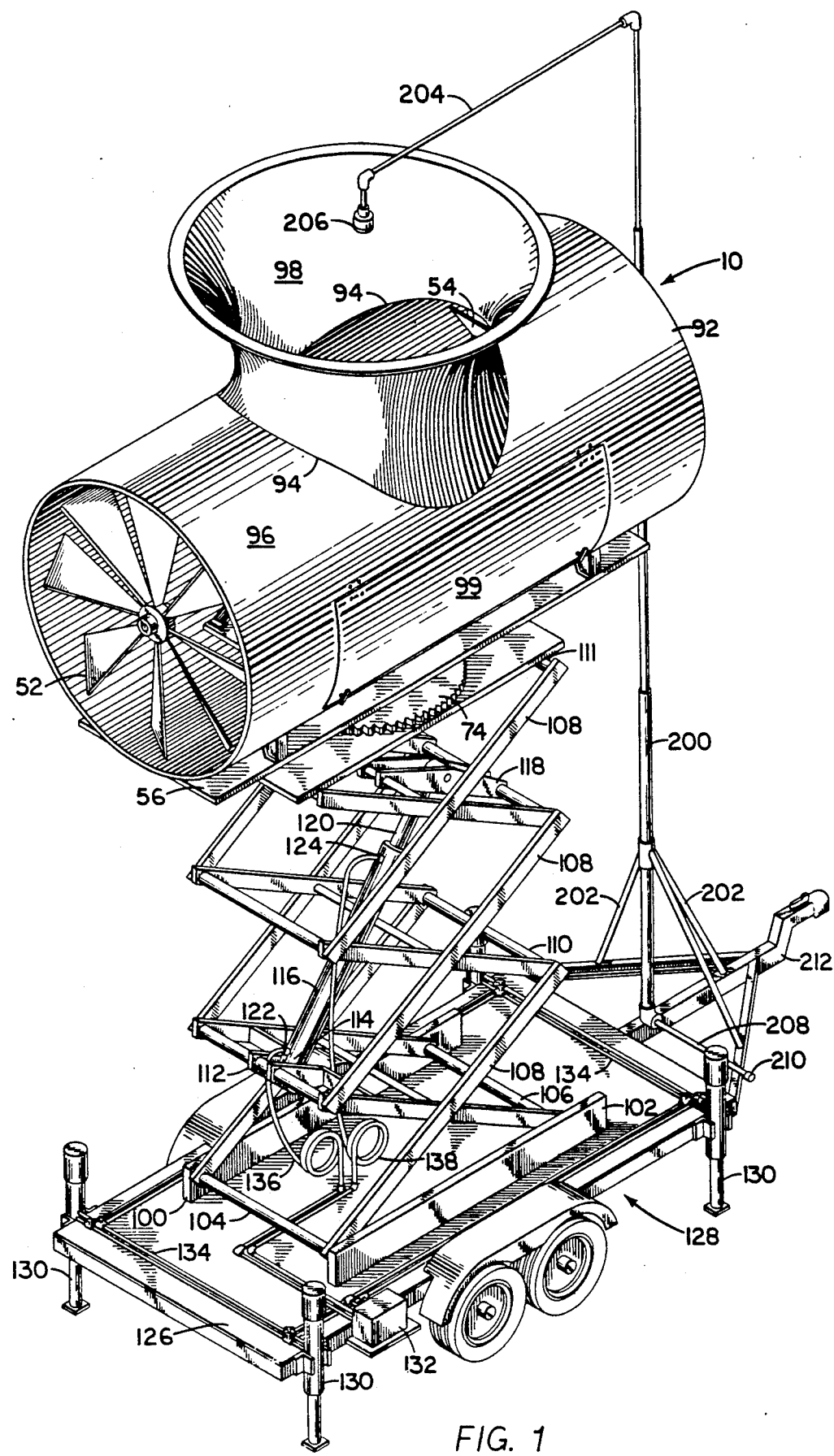
FIG. 1 illustrates the first embodiment of the invention in an elevated position.
Figure 2:
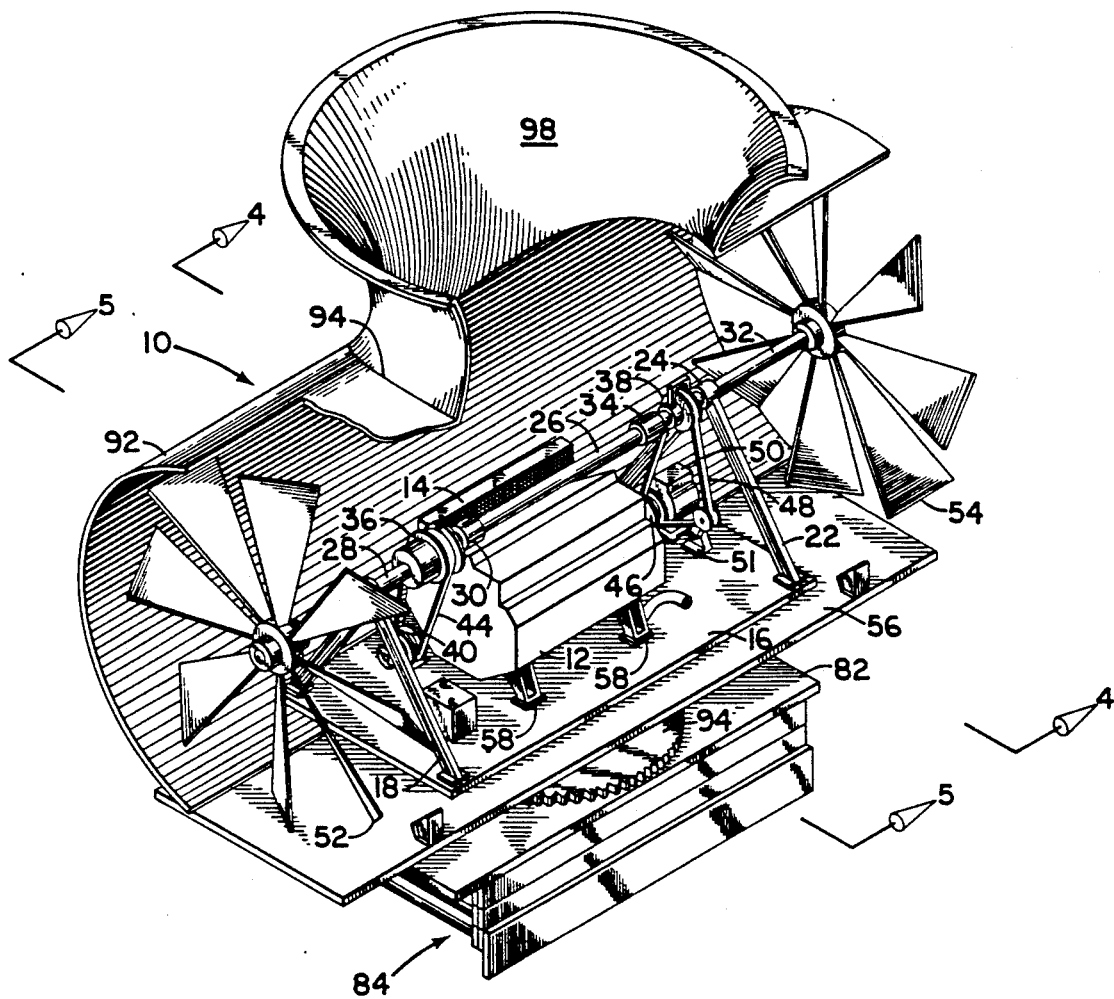
FIG. 2 illustrates the first embodiment of the invention with the shroud partially cut away and without the trailer.
Figure 3:
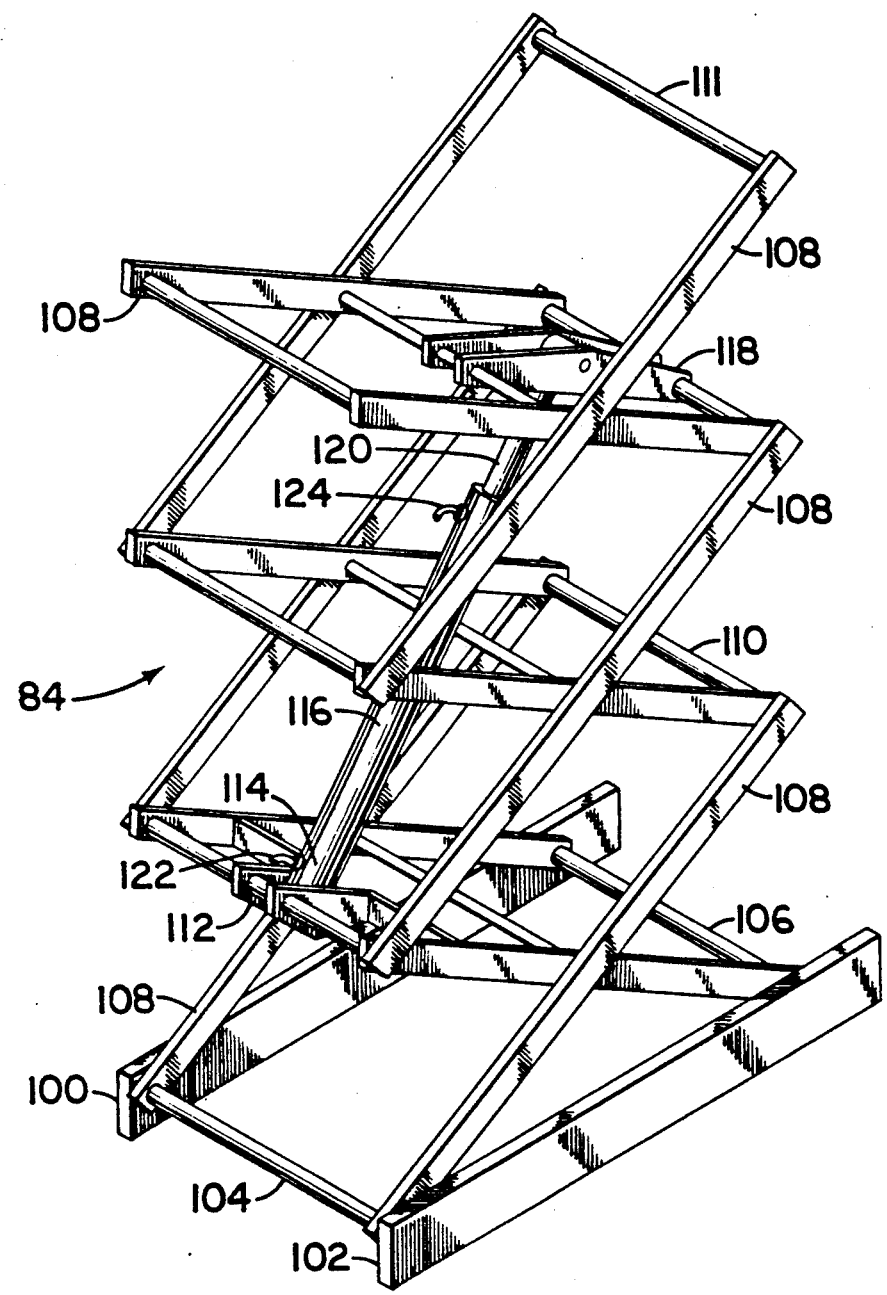
FIG. 3 illustrates the scissors jack.
Figure 4:
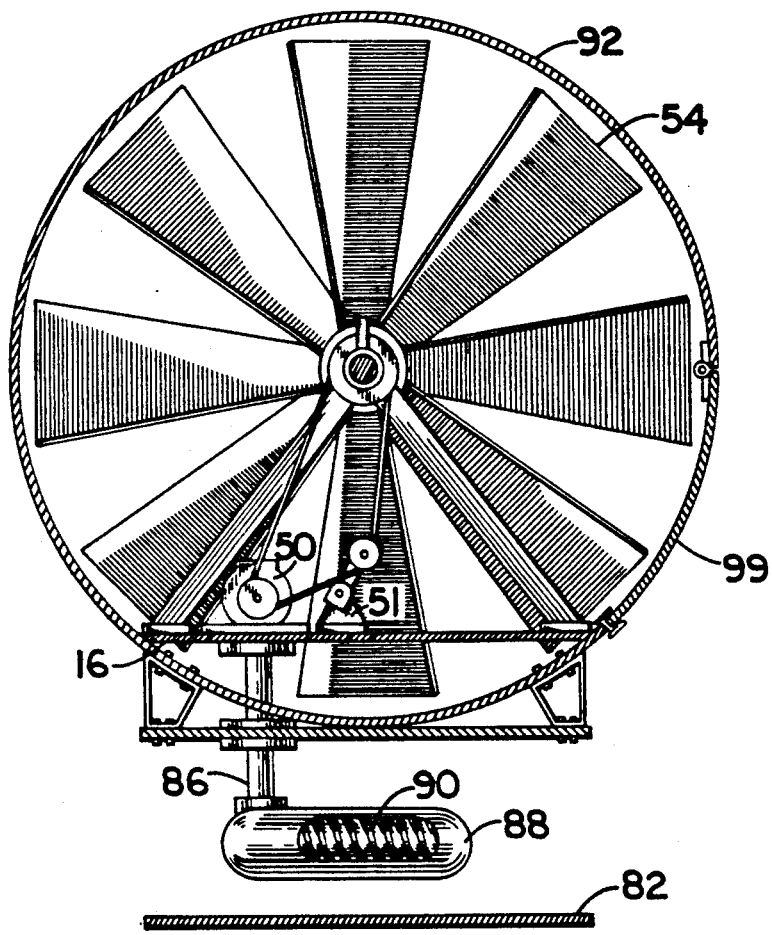
FIG. 4 illustrates a cross-section taken at lines 4—4 of FIG. 2.
Figure 5:
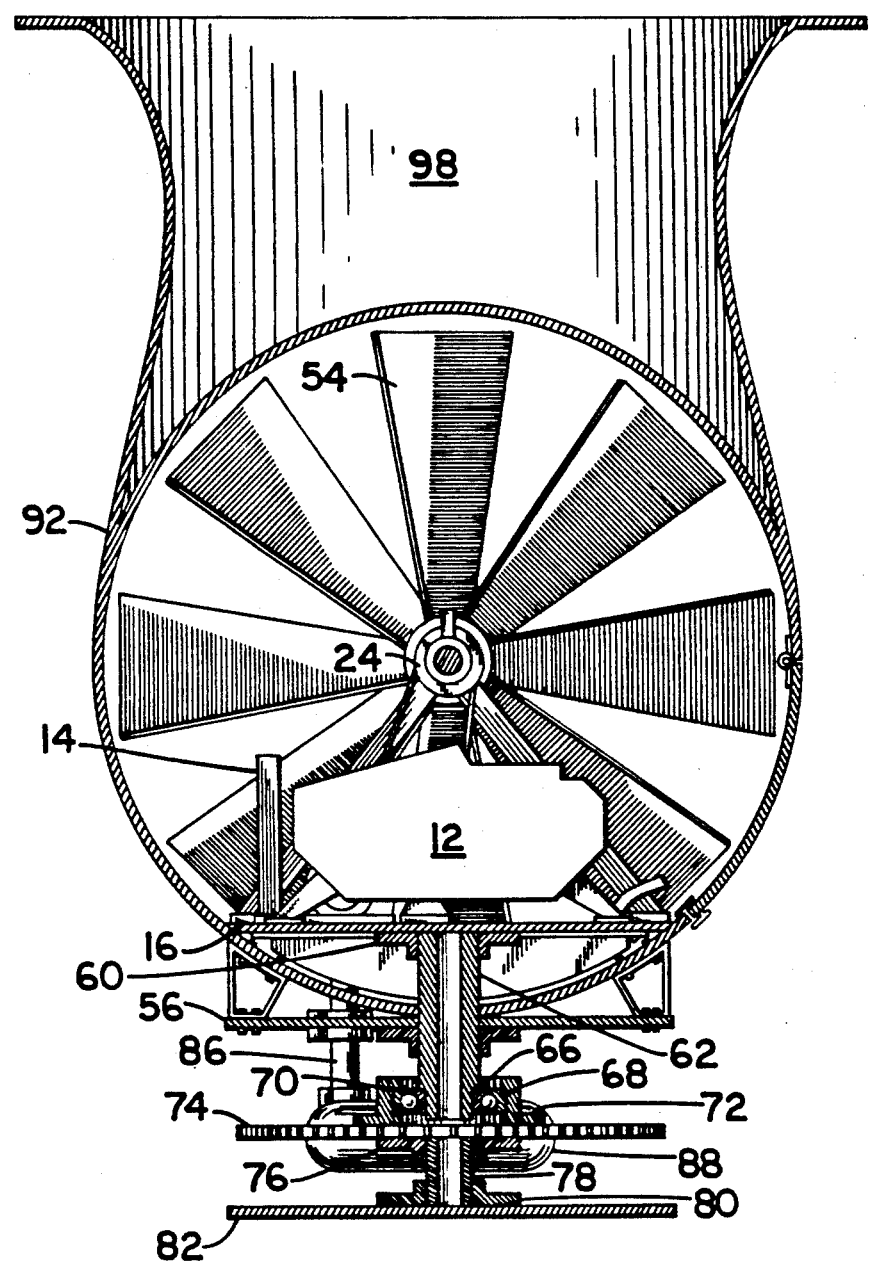
FIG. 5 illustrates a cross-section taken at lines 5—5 of FIG. 2.

The orchard heat exchanger of this invention is indicated generally as 10. An internal combustion engine 12 and cooling radiator 14 are mounted on upper baseplate 16. Bearing support 18 supporting propeller shaft bearing 20 is mounted at the end of upper baseplate 16 at the output end of engine 12. Bearing support 22 supporting propeller shaft bearing 24 is mounted near the opposite end of upper baseplate 16. The propeller shaft is made of three sections. Center section 26 is connected to forward section 28 by means of sleeve 30. Center section 26 is connected to after section 32 by means of sleeve 34. The purpose of sleeves 30 and 34 is to allow the shaft to be disassembled for servicing of driven pulley 36 and turntable drive pulley 38. Propeller shaft drive pulley 40 is mounted on the engine output shaft, and drives driven pulley 36 by means of belt 44. Turntable drive pulley 38 is connected to right-angle drive pulley 46 by means of belt 48. Right-angle drive pulley 46 is mounted on the input shaft of a first right-angle gearbox 50. A belt tightener 51 is mounted on upper baseplate 16 adjacent first right-angle gearbox 50 for the purpose of disengaging gearbox 50 from pulley 38. Propeller 52 is mounted on and keyed to the free end of forward shaft section 28. Propeller 54 is mounted on and keyed to the free end of after shaft section 32. The pitch of the propeller blades is such that the propellers draw air from inside the shroud (to be described later) and expel air out eother end of the shroud. Upper baseplate 16 is supported above lower baseplate 56 by means of supports 58.

Upper baseplate 16 is supported at approximately its center on flange 60 and hollow shaft 62. Flange 60 is rigidly attached to the upper end of hollow shaft 62. Lower baseplate 56 is supported by flange 64 which is rigidly attached to hollow shaft 62 at approximately the midpoint of hollow shaft 62. Step 66 near the lower end of hollow shaft 62 rests on the inner race of ball bearing 68. The outer race 70 of ball bearing 68 is retained within bearing collar 72 which is rigidly attached to worm ring 74. Worm ring 74 is supported by flange 76 which is rigidly attached to the upper end of tube 78. The lower end of tube 78 is rigidly attached to flange 80, which in turn is rigidly attached to upper plate 82 of scissors jack 84.

First right-angle drive gearbox 50 has and output shaft extending downward through enclosure 86. The output shaft connects to the input shaft of a second right-angle drive gearbox 88. Second gearbox 88 has a worm drive 90 as the output shaft. Worm drive cooperates with worm ring 74 so that, when first gearbox 50 is operational, worm drive 90 will operate to move the heat exchanger around worm ring 74 which is stationary.

The engine-propeller assembly is surrounded by a shroud 92, which is preferably made of fiberglass. Shroud 92 is cylindrical and is secured to lower baseplate 56. Shroud 92 is open at each end for the free flow of air from propellers 52 and 54. Shroud 92 has a large opening 94 at its upper side 96. Opening 94 is circular in plan view. A converging-diverging nozzle 98 is fitted on opening 94. A hinged access door 99 is provided in the side of shroud 92.

Scissors jack 84 comprises parallel base members 100 and 102 joined by cross braces 104 and 106. A series of frame members 108 are rotatably joined at each end in the middle of each member 108, and are spaced apart by cross braces 110. The upper ends of topmost members 108 are simply joined by cross braces 110. Bracket 112 supports the lower end 114 of hydraulic cylinder 116. Bracket 118 supports the piston rod 120 of hydraulic cylinder 116. Hydraulic connections 122 and 124 are fitted to cylinder 116. Crossbar 111 at the upper end of scissors jack 84 is arranged to slide along the lower side of scissors jack upper deck 82.

Base members 100 and 102 of scissors jack 84 are attached to the deck 126 of rectangular trailer 128. Trailer 128 is supported on a double axle located under the approximate midpoint of trailer 128. Hydraulic leveling jacks 130 are located at each corner of trailer 128. Battery-operated hydraulic pump 132 supplies fluid under pressure to the hydraulic system 134 which is connected to jacks 130, and to hydraulic hoses 136 and 138 which are connected to cylinder 116.

A telescoping water standpipe 200 is supported on the trailer hitch 212 by braces 202. Upper end 204 of standpipe 200 extends over air inlet 98 and terminates in spray head 206 over the approximate center of air inlet 98. Lower end 208 of standpipe 200 terminates in hose connection 210.

Figure 6:
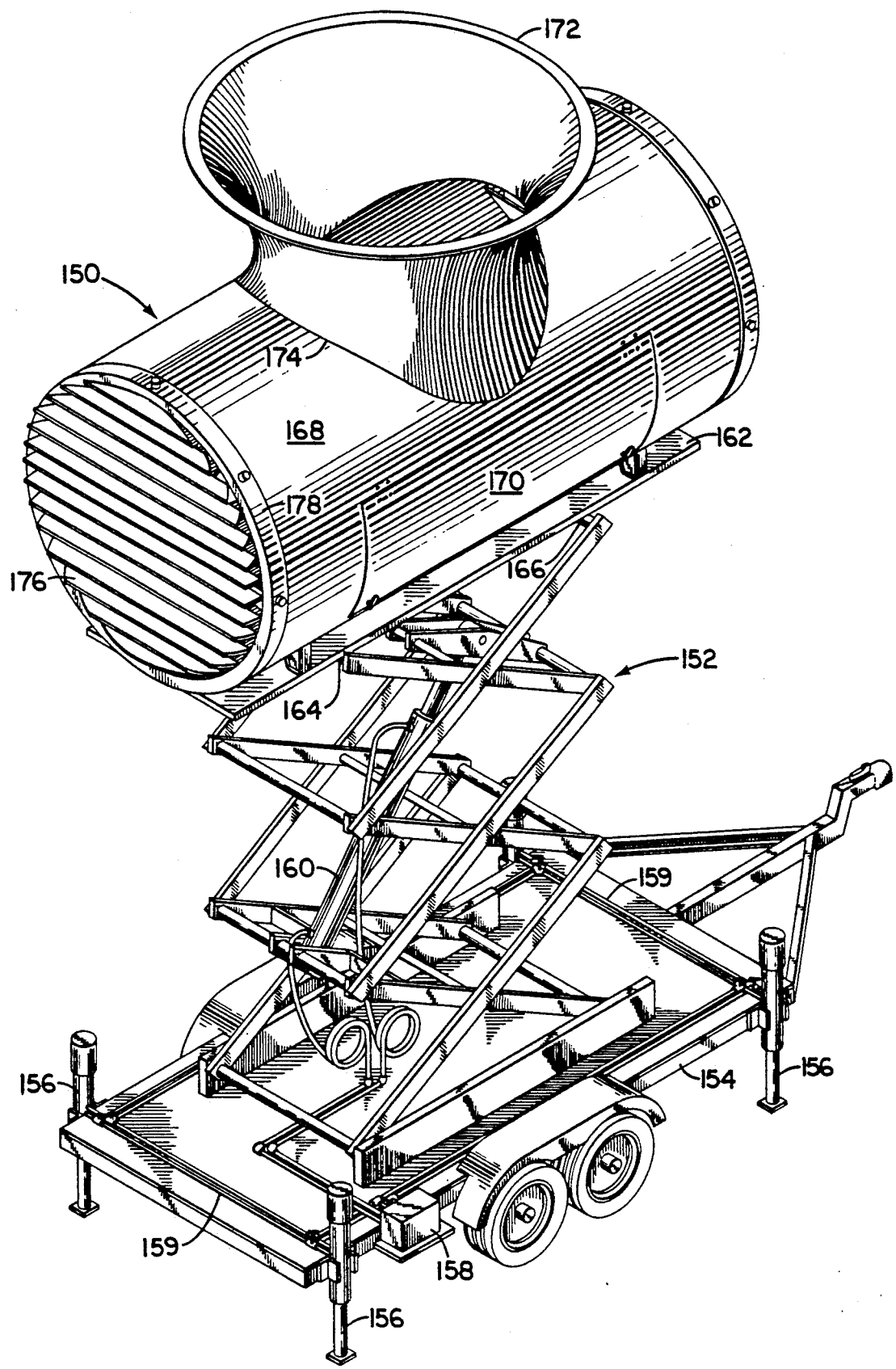
FIG. 6 illustrates the second embodiment of the invention in an elevated position.

A second embodiment of the orchard heat exchanger is illustrated in FIG. 6. The second embodiment, indicated generally as 150, is similar to the preferred embodiment with the exception that the second embodiment does not include means to rotate the upper assembly, but it does include directional louvers fitted to the ends of the shroud.

Scissors jack 152 is attached to trailer 154. Trailer 154 has a hydraulic leveling jack 156 at each corner. Battery-operated hydraulic pump 158 provides fluid through hydraulic system 159 to jacks 156 and to hydraulic cylinder 160 which operates scissors jack 152. Lower baseplate 162 is attached to crossbar 164 of scissors jack 152, and is slidably attached to crossbar 166. Shroud 168, having access door 170, is attached to lower baseplate 162. Converging-diverging entrance fitting 172 is attached to opening 174 in shroud 168. Movable louvers 176 attached to circular frame 178 are fitted at each end of shroud 168. Within shroud 168 are an upper baseplate, an internal combustion engine, a radiator, shaft bearing supports, a propeller shaft and a propeller at each end of the propeller shaft, and a means for driving the propeller shaft, similar to the preferred embodiment, but without the first gearbox.

While this invention is susceptible of embodiment in different forms, the drawings and the specification illustrate the preferred embodiments of the invention, with the understanding that the present disclosure is to be considered an exemplification of the principles of the invention, and the disclosure is not intended to limit the invention to the particular embodiments described.

I claim:

1. An orchard heat exchanger comprising:
   an internal combustion engine;
   a propeller shaft having a propeller on each end, said shaft being driven by the engine;
   a cylindrical shroud, said shroud surrounding the engine and propeller shaft and propellers;
   a converging-diverging air entrance at the top of the shroud;
   said engine, propeller shaft and propellers and shroud being mounted on a wheeled trailer; and
   means to elevate the engine, propeller shaft and propellers and shroud above the trailer.

2. An orchard heat exchanger comprising:
   an internal combustion engine mounted on a first baseplate;
   a shaft having a propeller on each end, said shaft being driven by the engine, and supported on the first baseplate;
   a second baseplate below the first baseplate and spaced apart therefrom;
   a cylindrical shroud enclosing the engine, shaft and propellers and attached to the second baseplate, said shroud being fitted with a converging-diverging air inlet at the top of the shroud;
   a wheeled trailer;
   a scissors jack mounted on the trailer, said scissors jack having a lift deck at its top end; and
   a means to rotate the second baseplate with respect to the lift deck.

3. The heat exchanger of claim 2 wherein the means to rotate the second baseplate comprises:
   a first right-angle bearbox mounted on the first baseplate, belt-driven from the propeller shaft, and with its output shaft oriented vertically downward;
   a second right-angle gearbox driven by the output shaft of the first gearbox, and located below the second baseplate;
   the output shaft of the second gearbox being a worm gear;
   a worm ring mounted above the lift deck and attached thereto and cooperating with the worm gear;
   a bearing collar and ball bearing centrally located above the ring gear; and
   a hollow shaft extending downward from the first baseplate, penetrating and attached to the second baseplate, said shaft being attached to the inner race of the ball bearing.

4. The heat exchanger of claim 2 wherein the trailer is rectangular in plan view, wherein the wheels are mounted under the center of the trailer, wherein the trailer has leveling means attached at each corner, and wherein the trailer has mounted thereon a hydraulic pump for supplying fluid under pressure for the leveling means and for the scissors jack.

5. The heat exchanger of claim 2 having a means to spray water into the air inlet of the cylindrical shroud.

6. The heat exchanger of claim 2 wherein the scissors jack is hydraulically operated.

7. An orchard heat exchanger comprising:
   an internal combustion engine mounted on a first baseplate;

a shaft, having a propeller on each end, said shaft being driven by the engine, and supported on the first baseplate;

a second baseplate below the first baseplate and spaced apart therefrom;

a cylindrical shroud enclosing the engine, shaft and propellers and attached to the second baseplate, said shroud being fitted with a converging-diverging air inlet at the top;

a wheeled trailer;

a scissors jack mounted on the trailer, said scissors jack being attached below the second baseplate; and said cylindrical shroud being covered at each end with a set of adjustable louvers.

8. The heat exchanger of claim 7 wherein the scissors jack is hydraulically operated.

9. The heat exchanger of claim 7 wherein the trailer is rectangular in plan view, wherein the wheels are mounted under the center of the trailer, wherein the trailer has leveling means attached at each corner, said leveling means being hydraulically operated.

10. The heat exchanger of claim 9 wherein the trailer has mounted thereon a hydraulic pump supplying fluid under pressure to the leveling means and the scissors jack.

* * * * *